(No Model.) 4 Sheets—Sheet 1.
B. PRICE.
MACHINE FOR SOLDERING CANS.
No. 331,909. Patented Dec. 8, 1885.
*Fig. 1.*
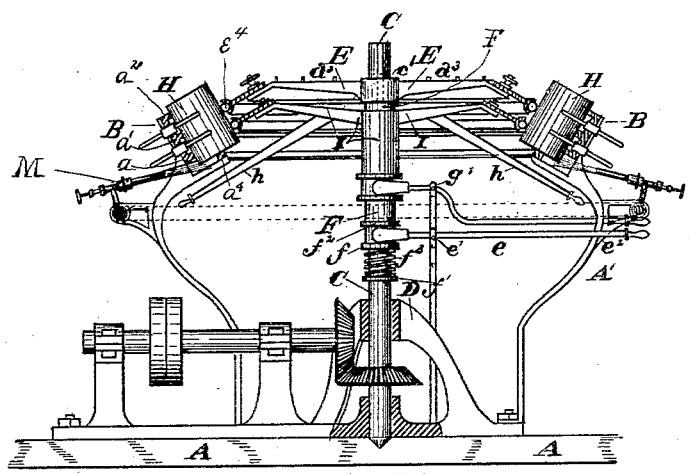
*Fig. 3.*    *Fig. 2.*    *Fig. 4.*
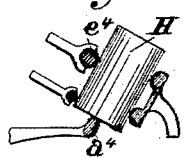 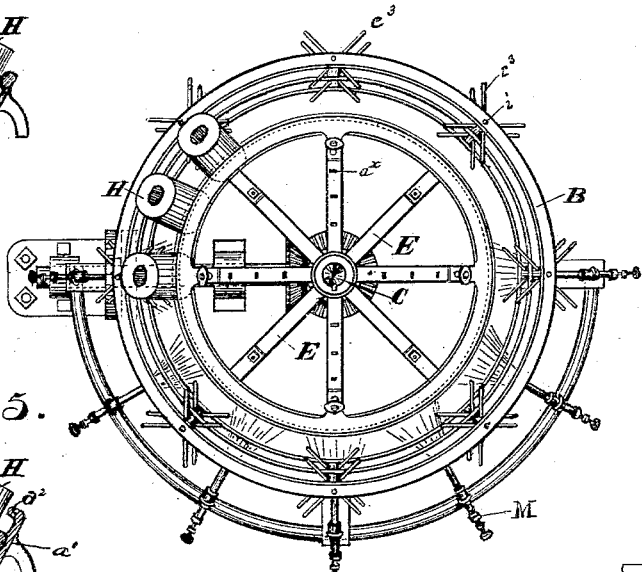 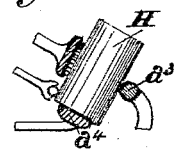
*Fig. 5.*          *Fig. 6.*
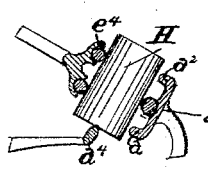 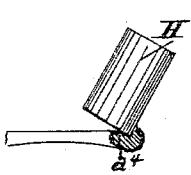
WITNESSES:
Edward W. Osse,
A Leslie Duvall
INVENTOR.
Benj. Price
By _____
Attorney.

(No Model.) 4 Sheets—Sheet 2.

B. PRICE.
MACHINE FOR SOLDERING CANS.

No. 331,909. Patented Dec. 8, 1885.

WITNESSES:
Edward R. Osse,
A. Leslie Duvall

INVENTOR.
Benj. Price
By
Attorney.

(No Model.) 4 Sheets—Sheet 3.

B. PRICE.
MACHINE FOR SOLDERING CANS.

No. 331,909. Patented Dec. 8, 1885.

WITNESSES:
Edward W. Osse,
A. Leslie Duvall

INVENTOR.
Benj Price
By
Attorney.

(No Model.)  4 Sheets—Sheet 4.

B. PRICE.
MACHINE FOR SOLDERING CANS.

No. 331,909.  Patented Dec. 8, 1885.

WITNESSES:
Edward A. Osse,
Arthur Stewart

INVENTOR.
Benj Price
By _____
Attorney.

N. PETERS, Photo-Lithographer, Washington, D. C.

UNITED STATES PATENT OFFICE.

BENJAMIN PRICE, OF BALTIMORE, MARYLAND.

MACHINE FOR SOLDERING CANS.

SPECIFICATION forming part of Letters Patent No. 331,909, dated December 8, 1885.

Application filed May 28, 1885. Serial No. 166,914. (No model.)

*To all whom it may concern:*

Be it known that I, BENJAMIN PRICE, of the city of Baltimore and State of Maryland, have invented a new and Improved Machine for Soldering the Tops and Bottoms of Metallic Cans to the Bodies, of which the following is a description, accompanied by drawings, in which—

Figure 7:
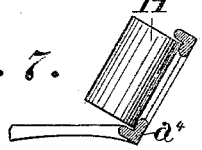
Figure 8:
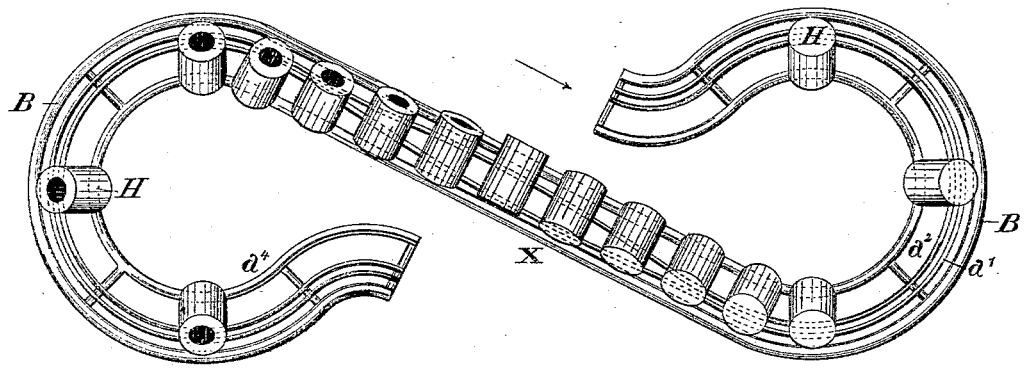
Figure 9:
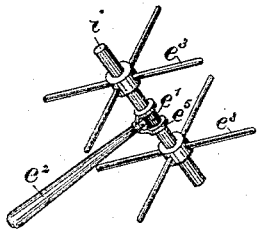
Figure 10:
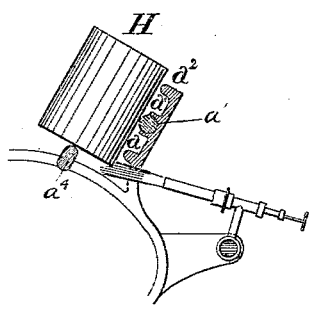
Figure 11:
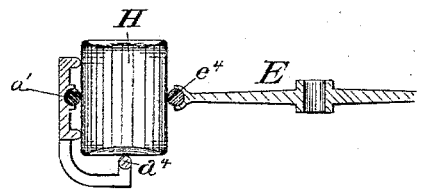
Figure 12:
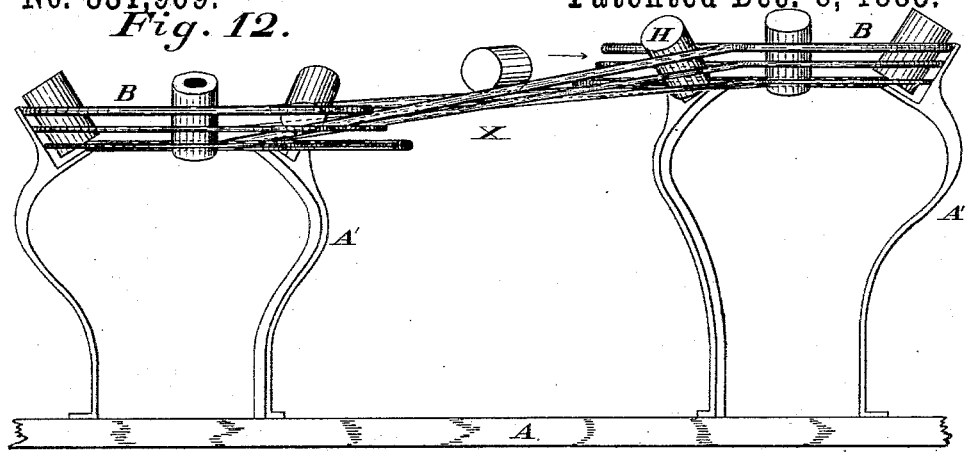
Figure 13:
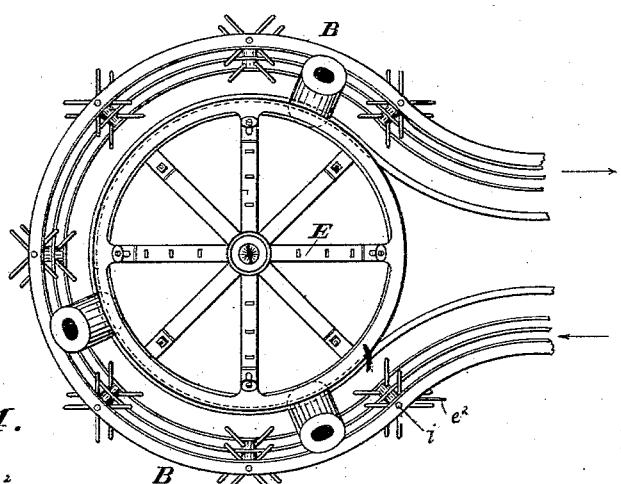
Figure 14:
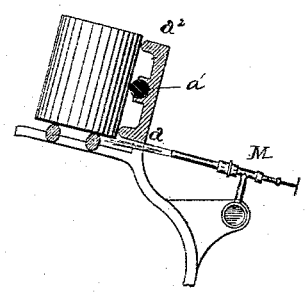
Figure 15:
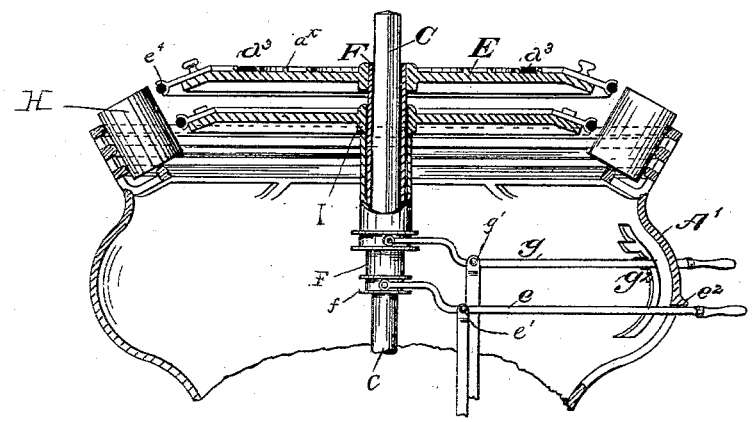
Figure 16:
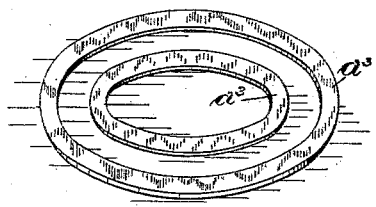
Figure 17:
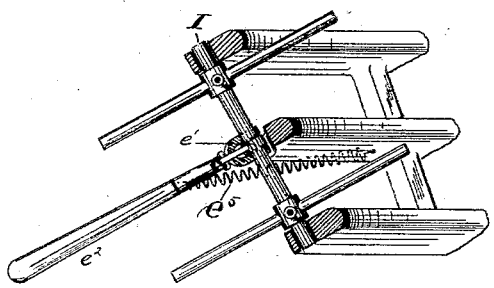
Figure 18:
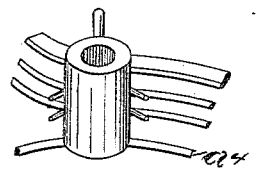

Figure 1 is an upright sectional view of the machine; Fig. 2, a plan of same, showing the heating devices. Figs. 3, 4, 5, and 6 show modifications of the bearings of the turning wheel and track. Fig. 7 is also a modification of these devices, and shows one can of a series with an overhanging holder. Fig. 8 is a plan view of the track leading from one machine to another and illustrating the method by which the cans are turned so as to present the unsoldered end to be soldered. Fig. 9 is a view of the spoked shaft with ratchet and pawl; Fig. 10, a view of a burner and can. Fig. 11 is a view of a can and track arranged perpendicularly. Fig. 12 is an elevation of the track leading from one machine to another, of which a plan view is shown in Fig. 8. Fig. 13 is a view of the track as cut away to provide an exit and an entrance for the cans. Fig. 14 is a view showing a can with its bottom resting upon two rails, also showing in section the rails at the side with the elastic bearing in the center and the burner directing the flame upon the bottom seam of the can. Fig. 15 is an upright sectional view of the upper part of the machine, with a portion of the sleeves of the wheels broken away in order to show the squared part of the central or main shaft. This figure also shows the lugs upon the legs of the machine under which the levers are thrust when the wheels are lifted. Fig. 16 shows the rings which are placed on top of the rolling-wheel when it is desired to give the wheel more weight. Fig. 17 shows the spoked shaft with handle, ratchet, pawl, and spring, the said spoked shaft being located at the entrance of the track where the cans are first started. Fig. 18 is another view of the same, showing the can in its place.

My invention consists in providing, in a soldering-machine, a circular track over which the cans are rolled during the process of soldering by a friction-wheel which rests upon the cans and rolls them around the track, and in certain novel arrangements of parts which will be more fully explained in detail.

A, Fig. 1, is a base of suitable material, upon which is properly supported the circular track B. C is an upright shaft, located centrally with the track B, and turning in a bearing in the bracket or pillow-block D. The upper end of this shaft may be square, as shown at $c$, Fig. 15, or, if made rounded, furnished with a feather, $c'$, as in Figs. 1 and 2. The wheel E is mounted upon and properly secured to a hollow sleeve, F, the upper part of which is squared to fit loosely upon the square $c$ of the shaft, or may be provided with a keyway to slide upon the feather in the shaft. The sleeve F projects downwardly, and is provided with a collar, $f$, between which and a collar, $f'$, upon the shaft C a spiral spring, $f^3$, may be placed, if desired. Another collar, $f^2$, upon the sleeve F leaves a space between the two collars $f$ and $f^2$, into which space the forked end of the lever $e$ is inserted, which lever has its fulcrum at $e'$. The upright A' has upon its side a projection, $e^2$, under which the arm of the lever may be placed and hitched when it is desired that the friction-wheel should be taken from the cans. Thus at any time the cans may be released from the weight of the turning or friction wheel by simply pressing upon the lever $e$. Should the cans run slightly untrue on the track, by lifting the turning-wheel they will by their own weight fall into proper position. The spring $f^3$, properly regulated as to tension, gives elasticity to the movement of the friction-wheel. In order to increase the weight of this wheel, if desired, the upper sides of the arms of the wheels are provided with upright projections $a$, between which rings of metal $a'$ may be placed until the desired weight is attained. The bearing face or surface of this wheel may be provided with a flexible material; but in order to secure a proper bearing upon all the cans I prefer to groove out the face of the wheel in the shape of an ordinary india-rubber or gutta-perch tube, and by springing such tube in the groove a good turning-surface will be provided, which will be flexible and elastic and adjust itself to a proper bearing upon each can on the track. This feature is shown at $e^4$, Figs. 1, 3, 5, and 15. The circular track may also be provided with an elastic bearing-surface made of tubing in the same way, as shown at $a'$. The circular track may have the rails $a$ and $a^2$ slightly depressed, so that the can will bear upon the elastic bearing $a'$. In an apparatus with a wheel and track thus constructed with their elastic bearing-points opposite to each other, or nearly so, there will practically be little or no difficulty in keeping the cans in line. The track upon which the cans are rolled I prefer to make of two or more rails, as $a$, $a'$, and $a^2$. The bottom of the can may rest upon a rail, as $a^4$, or may have its edge in a niche, as shown in Figs. 6 and 7. As the cans H have a tendency to ride up or advance the lower ends more than the upper ends, I have provided a brake-wheel, I, which fits loosely over the sleeve of the turning-wheel E and rests upon the cans while turning. This brake-wheel thus resting upon the cans diminishes the tendency of the cans to be propelled forward at their lower ends. A lever fulcrumed at $g'$ serves to lift the brake-wheel I from the cans, if desired. It will be observed that the cans are turned by the turning-wheel E, while the brake-wheel is turned by the cans. It may at times be advisable to stop the brake-wheel for a moment from turning in order to straighten the cans in proper line, or it may be desired to turn the brake-wheel in the reverse direction a slight distance. For this purpose I have attached to any suitable part of the wheel the handles $h$, which may at any time be grasped by the operator and held in position or turned in either direction. The circular track is cut out during a portion of its length, as shown in Fig. 13. One end of the cut-out portion provides an entrance for the cans, and the other end an outlet, as shown by the arrows in that figure. At or near the point of entrance of the cans I have provided means for straightening or lining the can, so that it may have a true start. The means thus provided is shown in Fig. 9, in which $i$ is a shaft or spindle provided with radiating arms or spokes $e^3$, located near the ends of the shaft, and so arranged as to enter between the rails of the circular track. Upon the intermediate part of this shaft I have placed a ratchet, $e'$, which is worked by a handle, $e^2$, carrying a pawl, which works the ratchet. The spindle is suitably journaled underneath the track, and the arms or spokes $e^3$ project between the rails. A spring, $e^5$, holds back the handle $e^2$ until pulled by the operator. As the spokes $e^3$ are set upon the shaft at right angles, it will be seen that a can entering upon the track will first touch two arms at opposite ends of the spindle. As soon as this occurs the operator pulls back the handle, when the can is thrust forward between the track and the turning-wheel E, and as the spoked shaft is set in the same vertical plane with the main shaft C, but at an angle thereto—that is to say, a line drawn through and following the center of the axis of the spoked shaft would if prolonged strike a similar line drawn through the axis of the main shaft C—the cans will be properly directed and have a true start upon the track. If the track be made perpendicular, then the spoked shaft should be adjusted parallel with the main shaft C. The handle, pawl, and ratchet may be dispensed with, if desired, and the shaft with the radiating arms located a little farther inwardly upon the track, so that the turning-wheel E, catching the can and binding it upon the track, will roll the can against the upper spokes of the shaft, and turn it by propelling the can against it. I have also located similar spoked spindles at intervals upon the track, as an additional means for keeping the cans in position on the track, as shown in Fig. 1. For this purpose I can use either the brake wheel or spoked spindles alone or together.

In order to adapt the machine to cans of different sizes, the turning-wheel E and the brake-wheel may be cast without a rim, and the ends of the spokes flattened, so as to receive the different-sized rims. This arrangement is shown in Figs. 1 and 2. The apparatus, as I have said, may have the lower rail of the track provided with a niche, in which the edge of the can may run. This lower rail may be heated to melt the solder which is placed inside the can; but the method which I prefer is to leave the bottom seams exposed, and subject them to the flame of one or more of the ordinary hydrocarbon-burners, M, arranged around the machine, and pointed at the seam, as shown in Figs. 2 and 10. The lower rail of the side track need not touch the cans, but should be placed close to them and low enough down to protect the longitudinal seam in the body of the can from too much heat from the flame of the burner, as shown in Figs. 10 and 14. If desired, the upper rail of the track may be bent over upon the top of the cans, so as to prevent a tendency of the can to ride upwardly, and keep it firmly against the base-rail upon which it rests, and also to prevent the bottom from springing, as shown in Fig. 7.

Two machines may easily be arranged to work together in soldering the cans, so that one may solder the top and the other the bottom, the machines being both alike. The first machine after soldering one end delivers the can to the other, which is arranged lower than the first, so that the cans may roll easily from one to the other, as shown in Fig. 8. In order to accomplish this properly, I arrange a track, X, between the outlet of the first machine and the inlet of the second. This track gradually changes its form so that the cans will turn over as they roll, and present the unsoldered end upward. Fig. 8 also shows the gradual turn in the track to accomplish this purpose.

The operation of the apparatus is as follows: The machine being ready for work, the operator places his hands upon the handles of the levers $e$ and $g$, and throws them under the lugs or projections $e^2$ and $g^2$, thereby lifting and hitching the two wheels E and I. He then places a number of cans, H, on the track to be used as dummies, and disengaging the levers allows the wheels to drop and rest upon the cans. The hydrocarbon-burners M are then opened and the flame allowed to play on the cans. The power is then applied and the turning-wheel E begins to move. The cans having been properly prepared with a suitable flux and a piece of segmental or drop solder placed inside, the operator feeds the cans to the machine as rapidly as may be desired. The wheel E, engaging the cans with the track, rolls them around, while the brake-wheel, resting upon the cans, prevents too much movement at the lower end and keeps them straight. Should an additional precaution be required, the spoked spindles assist the brake-wheel in this duty, or they may be used alone. At any time during the operation the workman may place his hand on the lever e and lift the wheel E, when the cans will immediately assume a proper position.

In order to operate the machine when the track is constructed in the form of a complete circle, as shown in Fig. 2, the turning-wheel and friction-wheel also (when the apparatus is provided with a friction-wheel) should be lifted, the cans inserted, and the machine put in motion until the cans are soldered. The wheels should then be lifted again to take the cans out.

The number of burners used may be regulated as circumstances require. When the cans leave the machine, they fall into a basket to receive them or roll upon the track to another machine, when the operator at that machine drops a piece of solder in the hole at the top, and the machine proceeds to solder the other head of the can in the same way as the first one.

The amount of incline of the track will depend upon circumstances, the object of inclining the track being to give an inclination to the cans, so that when the solder is melted by the heat it will run down to the edge. If it be preferred, however, the tops and bottoms of the cans may be constructed so that the solder will always find its way to the edge, in which case the track may be made perpendicular, and the cans entering the opening as heretofore described would stand upright, and be slightly compressed between the elastic bearing-surfaces of the track and turning-wheel. In such a case the device, for keeping the can true upon the track may be used or dispensed with.

What I claim, and desire to secure by Letters Patent, is—

1. In a machine for soldering the tops and bottoms of metallic cans, a circular track, upon which the cans are placed, in combination with a turning-wheel resting upon the cans, and arranged to roll the cans over the track, as described and set forth.

2. In a machine for soldering the tops and bottoms upon metallic cans, a circular track having a portion of its course cut away to provide an entrance and outlet for the cans, in combination with a turning-wheel resting upon the cans, and arranged to roll them over the track, as set forth.

3. In a machine for soldering the tops and bottoms upon metallic cans, a circular track over which the cans are rolled, in combination with the wheel E, provided with the sleeve F, to slip over the shaft C, and arranged to be turned by and slid upon said shaft, substantially as shown.

4. In a machine for soldering the tops and bottoms of metallic cans, the circular track and the turning-wheel E, in combination with the spring f, shaft C, and sleeve F, substantially as described.

5. In a machine for soldering the tops and bottoms of metallic cans, the circular track B and means for rolling the cans along the track, in combination with a brake-wheel resting upon and turned by the cans, substantially as shown and described.

6. In a machine for soldering the tops and bottoms of metallic cans, a circular track, B, and means for rolling the cans along the track, and the brake-wheel I, provided with means for arresting the movement of said wheel and turning it backward or forward, as described.

7. In a machine for soldering the tops and bottoms of metallic cans, an inclined circular track, B, and means for rolling the cans along the track, in combination with a brake-wheel resting upon and turned by the cans, and provided with means for lifting said wheel from the cans and dropping it upon them at the will of the operator, substantially as described.

8. In a machine for soldering the tops and bottoms of metallic cans, the combination of the turning-wheel E, the brake-wheel I, and circular track B, arranged and operating together substantially as described.

9. In a machine for soldering the tops and bottoms of metallic cans, the circular track B, in combination with the turning-wheel E and the brake-wheel I, provided with means for lifting and lowering said wheels in conjunction with or independently of each other, substantially as shown.

10. In a machine for soldering the tops and bottoms of metallic cans, the combination of a turning-wheel, and a circular track consisting of two or more rails, and having the rail opposite the bearing-surface of said wheel nearer to said bearing-surface than the others, substantially as described.

11. In a machine for soldering the tops and bottoms of metallic cans, a circular track provided with a flexible or elastic bearing-surface upon which the cans are rolled, in combination with the turning-wheel E.

12. In a machine for soldering the tops and bottoms of metallic cans, a circular track upon which the cans are rolled, in combination with a rolling or turning wheel provided with a flexible or elastic bearing-surface, substantially as described.

13. In a machine for soldering the tops and bottoms of metallic cans, the circular track B, in combination with means for rolling the cans on the track, the brake-wheel I, resting upon the cans, and having a flexible or elastic bearing-surface, substantially as described.

14. In a machine for soldering the tops and bottoms of metallic cans, a circular track provided with one or more armed or spoked spindles arranged with the track and cans, substantially as and for the purposes described.

15. In a machine for soldering the tops and bottoms of metallic cans, a circular track over which the cans are rolled, said track so constructed as to leave the lower edge of the can exposed, in combination with a rolling wheel resting upon and giving motion to said cans, and a series of burners arranged to direct flames upon the seams of the cans, substantially as described.

16. The above-described track X, located between two soldering-machines and twisted in its course, so as to turn the can end for end in its progress from one machine to the other.

17. The combination of two soldering-machines, each having a circular track over which the cans are rolled, with a track, X, located between the machines and connecting the tracks together, the said connecting-track being curved in its course, so as to present and connect the upper rail of one machine with the lower rail of the other, substantially as shown.

BENJAMIN PRICE.

Witnesses:
JOHN WILLIAMS,
A. LESLIE DUVALL.